United States Patent
Panchbudhe et al.

(10) Patent No.: US 7,831,544 B1
(45) Date of Patent: Nov. 9, 2010

(54) METHOD AND SYSTEM FOR REPRESENTATION OF COMMUNICATION DATA REPOSITORIES FOR ELECTRONIC DISCOVERY

(75) Inventors: Ankur P. Panchbudhe, Pune (IN); Veeral P. Shah, Mumbai (IN); Dinesh Jotwani, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 712 days.

(21) Appl. No.: 11/643,171

(22) Filed: Dec. 21, 2006

(51) Int. Cl.
*G06F 17/00* (2006.01)
(52) U.S. Cl. .................. 707/602; 700/612; 700/636
(58) Field of Classification Search .................. 707/602, 707/612, 636
See application file for complete search history.

(56) References Cited

U.S. PATENT DOCUMENTS

| 7,080,077 B2* | 7/2006 | Ramamurthy et al. | 707/754 |
|---|---|---|---|
| 7,103,602 B2 | 9/2006 | Black et al. | 707/101 |
| 2006/0173824 A1 | 8/2006 | Bensky et al. | 707/3 |

OTHER PUBLICATIONS

Stratify Legal Discovery, "State-of-the-Art Electronic Discovery That Makes Economic Sense," Stratify, Inc. (2006), pp. 1-6.
MetaLINCS Enterprise E-Discovery Suite Datasheet, MetaLINCS (2006), pp. 1-2.
MetaLINCS Enterprise E-Discovery Suite, "How Do You Know When It's Time to Bring E-Discovery In-House?" MetaLINCS (2006), pp. 1-5.
"Attenex Patterns Document Mapper," web page, available via the Internet at www.attenex.com, Dec. 19, 2006, Attenex Corp. (2006), pp. 1-2.
CaseCentral Electronic Discovery Services, CaseCentral, Inc. (2005), pp. 1-2.
CaseCentral: Online Review & Repository—Enterprise Edition, CaseCentral, Inc. (2006), pp. 1-4.
CaseCentral: Online Review & Repository—Law Firm Edition 4.0, CaseCentral, Inc. (2004), pp. 1-4.
Anton Leuski et al., "eArchivarious: Accessing Collections of Electronic Mail," Proceedings of the 25$^{th}$ International ACM SIGIR Conference on Research and Development in Information Retrieval, Toronto, Canada, Jul. 2003, p. 468.
Adam Perer et al., "Contrasting Portraits of Email Practices: Visual Approaches to Reflection and Analysis," Proceedings of the Advanced Visual Interfaces 2006 Conference, Venezia, Italy, May 2006, pp. 1-7.

* cited by examiner

*Primary Examiner*—Sana Al-Hashemi
(74) *Attorney, Agent, or Firm*—Campbell Stephenson LLP

(57) ABSTRACT

A mechanism to collate, interpret, target or view communication items retained by an organization is presented. Such a mechanism can be used as an aid in identifying communication items (e.g., documents) during electronic discovery, as well as discovery of communication chains. Embodiments of the present invention provide a method, system, apparatus and computer program product for storing communication data, generating a people map data structure using the communication data, generating an evidence map data structure using the communication data, and coupling the people map data structure and evidence map data structure.

31 Claims, 8 Drawing Sheets

METHOD AND SYSTEM FOR REPRESENTATION OF COMMUNICATION DATA REPOSITORIES FOR ELECTRONIC DISCOVERY

FIELD OF THE INVENTION

The present invention relates to data analysis, and particularly to a system and method for analyzing a communication data repository using a mapping of people linked by communications items and a mapping of communications items linked by relationships between the data items.

BACKGROUND OF THE INVENTION

The ever-increasing reliance on information and the computing systems that produce, process, distribute, and maintain such information in its various forms, continues to put great demands on techniques for providing data storage and access to that data storage. Business organizations can produce and retain large amounts of communication items. Large organizations, for example, can generate and retain billions of emails, instant messages and telecommunications (e.g., voicemail, phone records, facsimile records, and the like), annually. Such an organization can also generate and retain millions of documents that are distributed among individual members of the organization. These various types of communication items can result in a complex web of interrelationships between individuals within an organization who distribute and receive the communication items, and the communication items themselves due to the relationships between various communications items.

In the event that an organization becomes involved in litigation, these complex webs of people and data need to be detangled during preparation for discovery. Plaintiffs and defendants engaged in litigation can be expected to electronically produce at least a relevant portion of the retained communication items. Current discovery rules require production of relevant electronically stored information early in discovery proceedings. But review of communication items using traditional search methods can be slow, is largely linear, and can tax an organization's information technology resources to the point of disruption of normal services.

It is therefore desirable to have a mechanism for distilling and/or presenting the vast quantities of communication items retained by an organization. It is further desirable that such a mechanism provide tools for interpreting the relationships between people and communication items, targeting important relationships and/or communication items, and/or viewing communication items of interest.

SUMMARY OF THE INVENTION

The present invention can provide a mechanism to collate, interpret, target or view communication items retained by an organization. Such a mechanism can be used as an aid in identifying communication items (e.g., documents) during electronic discovery, as well as discovery of communication chains. Embodiments of the present invention provide a method, system, apparatus and computer program product for storing communication data, generating a people map data structure using the communication data, generating an evidence map data structure using the communication data, and coupling the people map data structure and evidence map data structure.

One aspect of the above embodiments provides for generating the people map data structure by identifying each communication item associated with a person and linking that person with the recipient of the communication item. A further aspect of the above embodiments provides for displaying an image of the people map data structure, wherein a node of the image corresponds to a person in the people map data structure and a link between nodes corresponds to one or more identified communications between people represented by the nodes. Another aspect of the above embodiments provides for displaying select information related to the nodes and links of the people map image, wherein the select information comprises at least metadata related to the nodes and links.

Another aspect of the above embodiments provides for generating the evidence map data structure by identifying a relationship between an item of stored communication data and another item of stored communication data. A further aspect of the above embodiments provides for the relationships between items to be one or more of substantial similarity, reference, inclusion and derivation. Another aspect of the above embodiments provides for displaying an image of the evidence map data structure, wherein a node of the image corresponds to a communication item and a link between nodes corresponds to a relationship between the communication items represented by the nodes. Another aspect of the above embodiments provides for displaying select information related to the nodes and links of the evidence map image, wherein the select information comprises at least metadata related to the nodes and links.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

The present invention can provide a mechanism to collate, interpret, target or view communication items retained by an organization. Such a mechanism can be used as an aid in identifying communication items (e.g., documents) during electronic discovery, as well as discovery of communication chains. Embodiments of the present invention can analyze an organization's retained communication items to provide two mappings of the information: a people map and an evidence map. The people map may include nodes representing people associated with the organization connected by links representing communication items transmitted between the people. The evidence map may include nodes representing communication items (e.g., electronic mail, files, instant messaging (IM) conversations, and various telecommunications), which are linked by relationships between the communication items. Embodiments of the present invention can couple the people map with the evidence map through the use of metadata and other data related to the items of communications.

During litigation-related discovery proceedings, two areas of primary importance are information about the people associated with an organization and items of evidence. In an organization's communication data repository, these basic areas correspond to employees of the organization and the communication items those employees generate. Embodiments of the present invention may use this basic assumption to provide discovery-related functionality.

Figure 1:
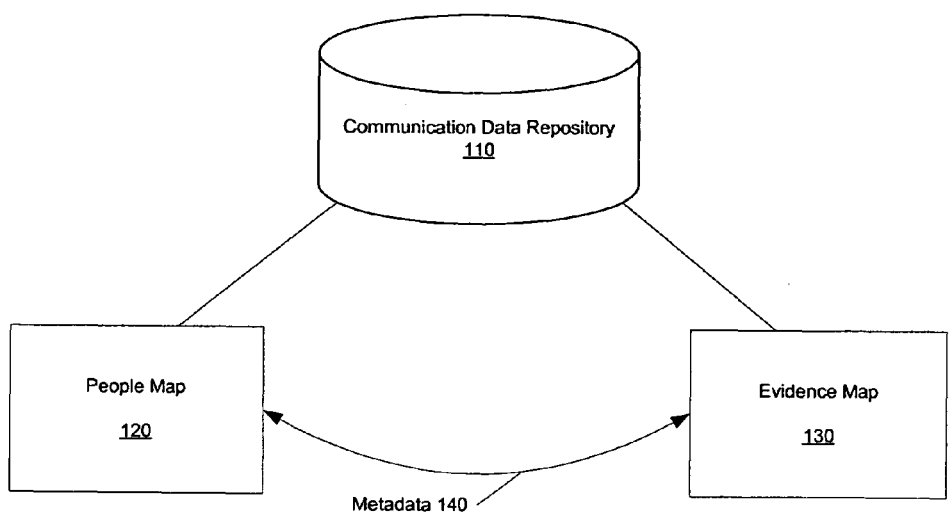
FIG. 1 is a simplified block diagram graphically illustrating a people map and an evidence map for use with embodiments of the present invention.

FIG. 1 is a simplified block diagram illustrating the above assumption. An organization can have one or more communication data repositories 110 that contain communication items associated with or taking the form of, for example, electronic mail, instant messaging, various telecommunications records, and file archives. The items stored in communication data repository 110 can be interpreted either in terms of the people associated with each item (e.g., people map 120) or by the content of the items and the relationships established by that content with other items stored in repository 110 (e.g., evidence map 130). Metadata 140, associated with the items of communication, can be used to couple the information in evidence map 130 with that in people map 120. Alternatively, data associated with a communication item represented by the evidence map can be used to provide the coupling between evidence map 130 and people map 120.

A "map" can be visualized as a graph with annotated nodes and links between the nodes. In the people map, the nodes can be the people or "parties" such as distribution lists, and the links between the nodes can be retained communication items transmitted between the people represented by each node.

Figure 2A:
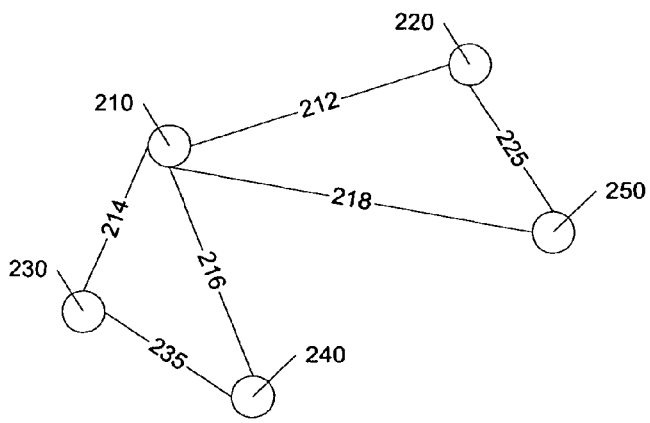
FIG. 2A is a simplified block diagram illustrating a visualization of a people map in accord with embodiments of the present invention.

FIG. 2A is a simplified block diagram of a visualization of a people map data structure in accord with embodiments of the present invention. Nodes 210, 220, 230, 240 and 250 represent people who are either senders or recipients of communication items stored in communication data repository 110. Each node may represent a person or a party (e.g., a distribution list or a group) who is either associated with the organization or who has been communicated with by a person in the organization (e.g., a node can represent a person or party outside the organization who is communicating with a person or party in the organization). Links 212, 214, 216, 218, 225 and 235 can represent the various retained communications between the people represented by the nodes. Each link can represent one or more of the various retained communications between the nodes, such as electronic mail, instant messaging, facsimiles, telecommunication records, and other file exchanges. Both the nodes and the links can have associated metadata and additional data about the people and the communication items. For example, a node can be attributed with information like name, department, designation, and level of importance to the litigation. Such information can be provided to the people map by, for example, a database (e.g., directory services provided by PeopleSoft® or Microsoft® Active Directory or information from an identity management system). A link can be attributed with, for example, information such as electronic mail headers and body, communication statistics (e.g., frequency and times), and a summary of the communication item.

Figure 2B:
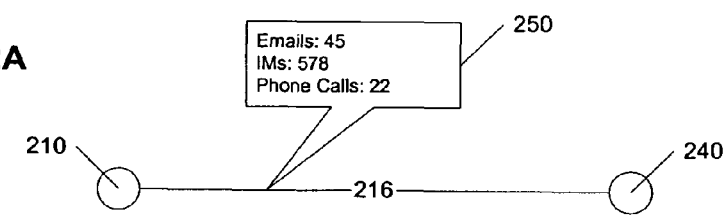
FIG. 2B is a simplified block diagram illustrating a visualization of link information that can be provided by embodiments of the present invention.

FIG. 2B is a simplified block diagram illustrating link information that can be provided by embodiments of the present invention. Nodes 210 and 240 are coupled by link 216. Visualization of the people map data structure can provide a focus on link 216 (for example, by selecting the link with a mouse pointer) to provide information about various types of communication items represented by link 216, along with the attributed information discussed above. Such information can be provided in a visualization by, for example, a focus balloon such as 250. Focus balloon 250 can also provide information based on the various metadata associated with the links between the nodes.

The types of information that can be provided about both nodes and the links can be associated with "information planes" in a visualization of the people map. An information plane can be, for example, of the following types: data, functionality or a combination of data and functionality. A data plane can add or remove or change data/metadata from the components of a map (nodes, links or sets of nodes and links). Functionality planes can add, remove or change functionality or controls of a map; that is, what a user of the visualization of the map is permitted to do with the map at that level. For example, a functionality plane can add a context menu item when a user zooms into a particular level, or can be used to change the result of a pointer selection (e.g., showing a summary at a high zoom but details from a database when a lower level plane is activated), or disabling a menu option for looking at financial details.

Information planes associated with the people map can be, for example, people-related or communication-related. For example, an information plane for departmental taxonomy will associate the various people nodes with their departments (e.g., drawing such information from an organization chart or the like). Another example is an email-only communication plane which will restrict the visualization of the people map to only links related to electronic mail. Thus, an information plane associated with the people map can provide flexibility and clarity to analysis of the people map.

A people map data structure can be generated by analyzing the information in communication data repository 110. Each communication item in repository 110 can be reviewed for information related to the people associated with that item. The people map data structure can then be provided with information related to each person and the nature of the communication link between them. As additional communication items are introduced to communication data repository 110, the people map data structure can be updated with the additional information related to those items. The people map data structure can be stored in a persistent manner so as to enable visualization or other use of the people map data structure in an efficient manner.

Figure 3A:
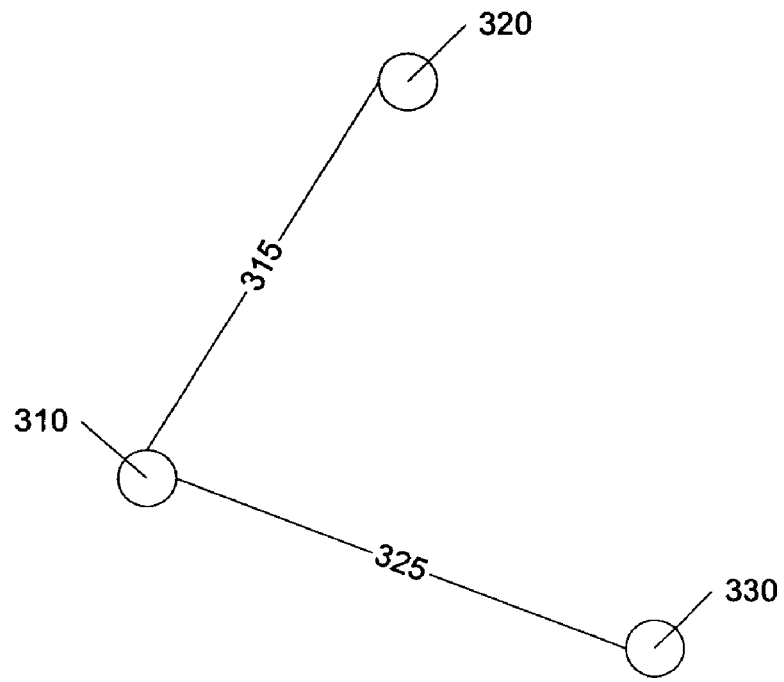
FIG. 3A is a simplified block diagram illustrating a visualization of an evidence map in accord with embodiments of the present invention.

FIG. 3A is a simplified block diagram illustrating a visualization of an evidence map in accord with embodiments of the present invention. Nodes 310, 320 and 330 represent communication items stored in communication data repository 110. These communication items can be, for example, representative of electronic mail, voicemail, file transfers, instant message communications, facsimile transmissions, and other records of telecommunications (e.g., telephone communications, push-to-talk, cellular short message service, PIN messages, and the like). Links 315 and 325 between nodes are representative of relationships between communication items represented by the nodes. Examples of relationships represented by links are similarity of item content, reference by an item to another item, and inclusion of an item within another item. As with the people map, nodes can be attributed with data and metadata relevant to the communication item. Such data and metadata can be, for example, a header and body of an electronic mail. A link can be attributed with the property of the relationship represented, for example, why the two nodes of the link are similar, or how the communication items represented by the nodes reference one another.

Figure 3B:
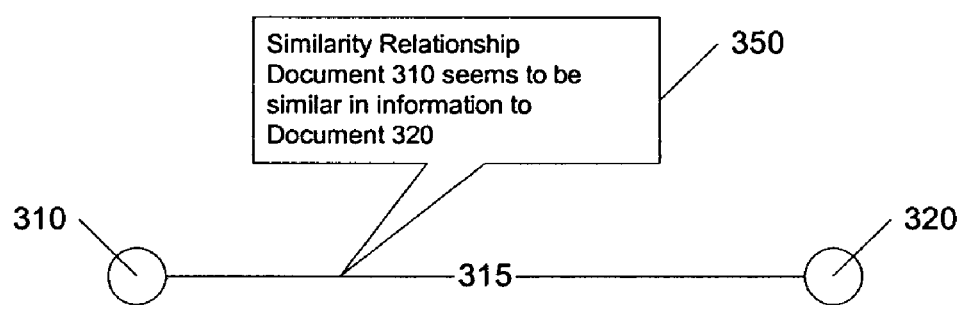
FIG. 3B is a simplified block diagram illustrating a visualization of link information between nodes in an evidence map in accord with embodiments of the present invention.

FIG. 3B is a simplified block diagram illustrating a focus on a link between nodes in an evidence map in accord with embodiments of the present invention. Embodiments of the present invention can provide through visualization a focus on a link between nodes. Focus 350 provides information related to link 315 between nodes 310 and 320. The illustrated example indicates that the link is representative of a similarity relationship in which document 310 contains information that is similar to information in document 320. As with the people map, information planes can be overlaid on the evidence map to restrict or enhance the types of information available when viewing the evidence map. Evidence map planes can include, for example, taxonomies, thematic clustering, planes for creating virtual folders, and planes enabling data trails between various nodes (i.e., the progression of a document through various versions).

Nodes in the evidence map data structure can be associated with the various communication items in communication data repository 110. The links between the various nodes can be created using data-mining techniques on the items stored in repository 110, such as clustering, classification, finding similar information, statistics collection, sentiment mining, collaborative filtering, and the like. The information generated by such data-mining techniques can then be stored in the evidence map data structure associated with the various nodes.

Both the people map data structure and the evidence map data structure can be comprised of elements having attributes, or metadata, such as name-value pairs stored in, for example, a fast query database. Information planes related to the various information in the people map data structure and the evidence map data structure can be generated by using, for example, categorization techniques and organization charts.

The map visualizations can also be used to highlight patterns of behavior related to communications. For example, a communications chain (nodes and links) related to a particular communication item can be highlighted on the people map visualization. Such a communications chain can reviewed for a "star pattern," which can provide the source of the communication in question. The people map visualization can also be used to track peaks and valleys of communication traffic between nodes over time, or how a communication chain develops over time. To aid in this, the map visualizations can include a time interface (e.g., a time slider) that can be used to illustrate the changes that occur to the maps over time.

Figure 4:
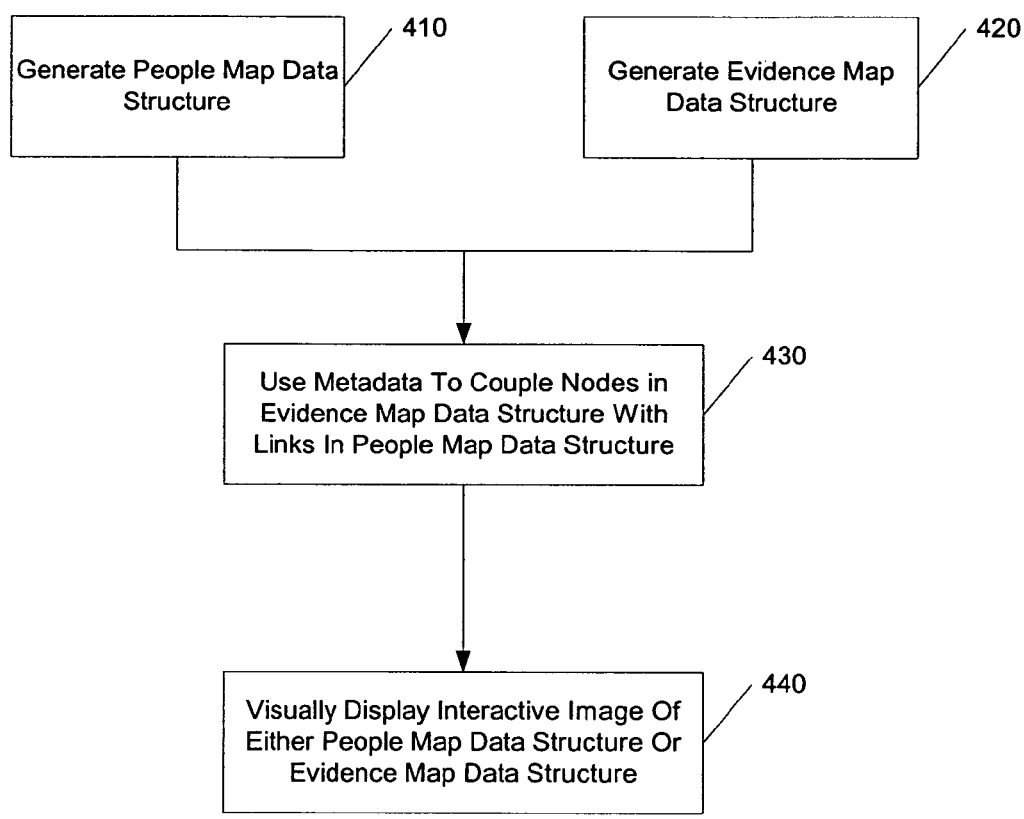
FIG. 4 is a simplified flow diagram illustrating generation and visualization of people and evidence maps in accord with embodiments of the present invention.

FIG. 4 is a simplified flow diagram illustrating generation and visualization of people and evidence maps according to one embodiment of the present invention. Embodiments of the present invention generate a people map data structure (410) and an evidence map data structure (420) by analyzing communication items in a communication data repository (e.g., 110). Generation of the people map data structure and the evidence map data structure can occur sequentially or concurrently. As described above, during generation of the people map data structure and the evidence map data structure, information about the various communication items in the communication data repository can also be stored in either data structure. This additional information can be used as metadata to couple nodes and links within the people map data structure to nodes and links within the evidence map data structure (430). The people map data structure and/or the evidence map data structure can be visually displayed through a graphical user interface to provide a user with an interactive means to review and analyze the data in the data structures (440).

It should be noted that the people map data structure and the evidence map data structure can be generated from one or more communication data repositories. Each type of item of communication (e.g., electronic mails, voicemails, instant messaging, and the like) can have a separate communication data repository from which information is gleaned. In a preferred embodiment of the present invention, information generated by various communication modes in an organization can be collected and archived in a single repository or "vault," which is then analyzed to generate the people map data structure and the evidence map structure (e.g., through the use of software such as Symantec's Veritas Enterprise Vault™). In addition, as discussed above, other databases can be accessed to provide information related to, for example, the people identified for the people map data structure, such as position within the organization, work group, telephone number, and the like.

Figure 5:
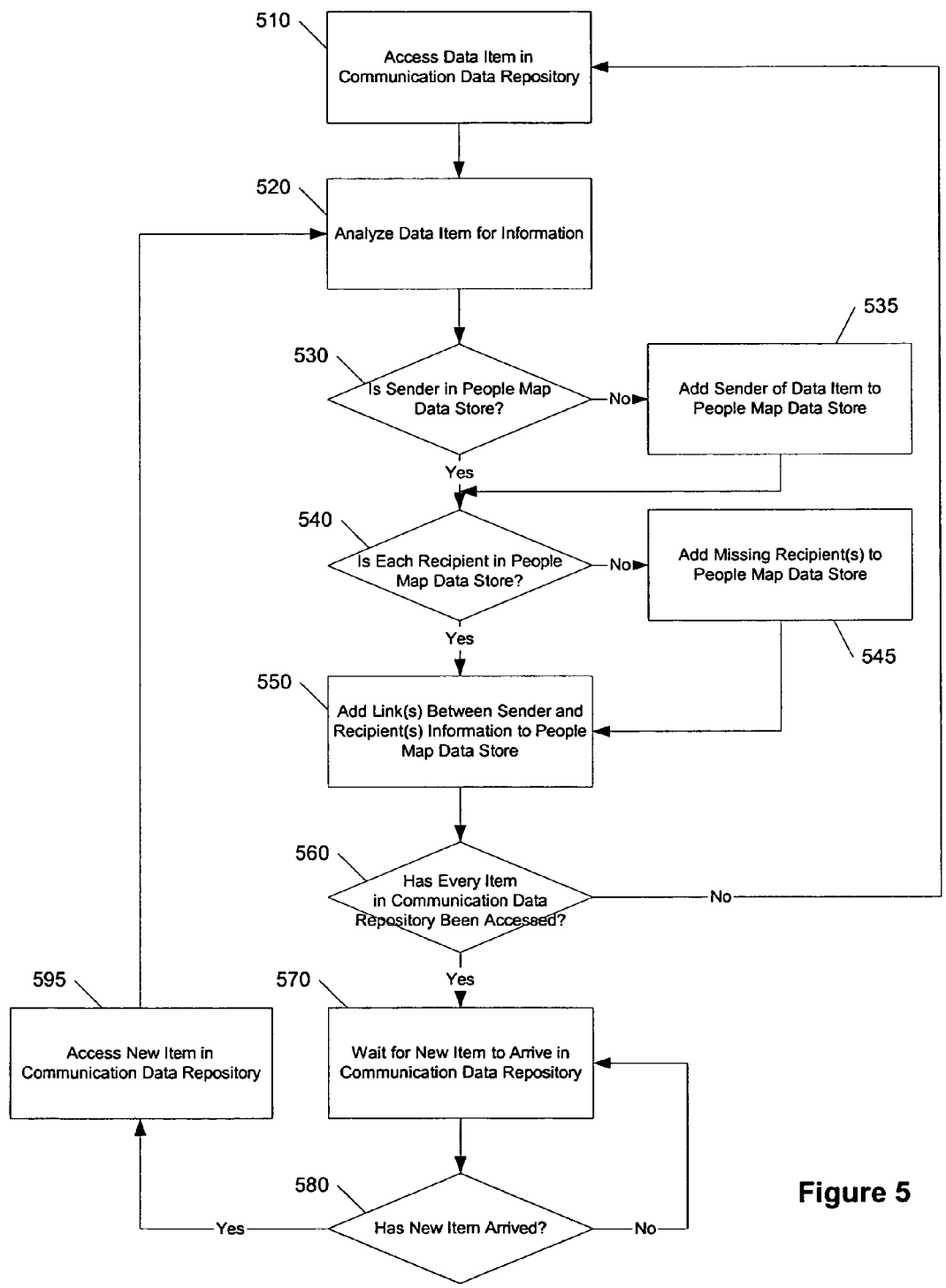
FIG. 5 is a simplified flow diagram illustrating generation of a people map data structure in accord with embodiments of the present invention.

FIG. 5 is a simplified flow diagram illustrating steps performed to generate a people map data structure, in accord with embodiments of the present invention. A communication item in a communication data store is accessed (510). The item can then be analyzed for information, such as sender, recipient, subject, date and time of the communication, and the like (520). The people map data store can then be reviewed to determine if the sender of the communication item is already present in the people map data structure (530). If the sender is not already in the people map data structure, then an entry for the sender can be added to the people map data structure (535). A determination can then also be made as to whether each recipient of the communication related to the data item is also in the people map data structure (540). Entries for any missing recipients can then be added to the people map data structure (545). The information about the communication item can then be added to the people map data structure and associated with either the sender or both the sender and recipients of the communication item represented by the information (550). This information can be used to generate the links between the sender and recipients, as well as information represented by the information planes, when the people map data structure is visualized.

A determination can then be made as to whether every item in the communication data store has been accessed (560). If not, then a next item in the communication data store can be accessed (510). If all items in the communication data repository have been accessed, then the people map generator can wait for a new item to arrive in the communication data repository (570). When a new item has arrived (580), then that new item can be accessed (590) and analyzed for information (520). Embodiments of the present invention can continue the process of updating the people map data structure even after the people map data structure has been visualized (e.g., as in 440). Embodiments of the present invention can update the user interface that is visualizing the people map data structure with the new information as it arrives and is processed (including, for example, gathering necessary identification data from external directories such as PeopleSoft® or Microsoft® Active Directory or other identity management systems).

Figure 6:
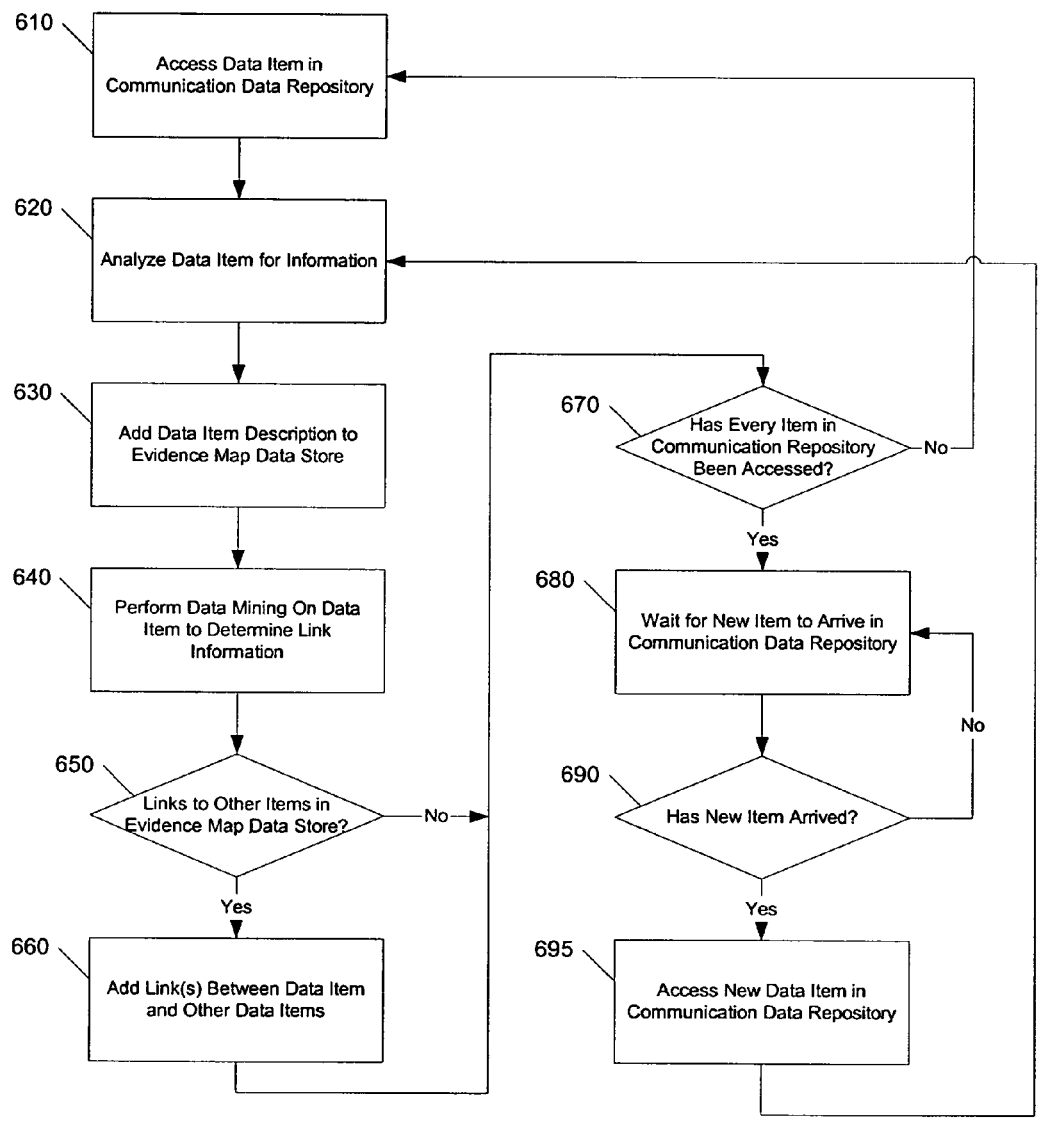
FIG. 6 is a simplified flow diagram illustrating generation of an evidence map in accord with embodiments of the present invention.

FIG. 6 is a simplified flow diagram illustrating the generation of an evidence map in accord with embodiments of the present invention. A communication item is accessed in the communication data repository (610). That item is then analyzed for information related to that item (620). A description of that communication item can then be added to an entry of the evidence map data structure (630). Links between the communication item and other items stored in the evidence map data structure can be determined through the use of data mining techniques (640). Such data mining techniques are known in the art and include, for example, classification techniques such as clustering, collecting statistics, collaborative filtering, and the like. Data mining can thus be used to determine similarity relationships between items of data, references to communication items within other communication items, and inclusion of an item within another item. If a link between the current communication item and another item in the evidence map data structure is found (650), then information related to that link can be added to the evidence map data structure, including information such as the relationship between the items (660). In addition, information related to the communication item itself can be associated with the record of the data item, including data and metadata such as headers and the body of an electronic mail message, time of communication, mode of the communication and the like.

A determination can then be made as to whether every item in the communication data repository has been accessed in the building of the evidence map (670), and if not, a next item in the communication data repository can be accessed and processed (610). As with the people map data structure, after each item in the communication data repository has been accessed, the evidence map generator can wait for new items to arrive in the communication repository (680), and when a new communication item arrives (690), that item can be accessed (695) and analyzed (620). The evidence map data structure can be accessed to provide a visualization in a graphical user interface, and as new communication items arrive, the visualization can be updated to represent the new items of information. Items of information can also be incorporated from data sources external to the communication data repository, for example, from external logs and audit trails (e.g., who accessed data, when they accessed it, how they accessed it, and the like).

Figure 7:
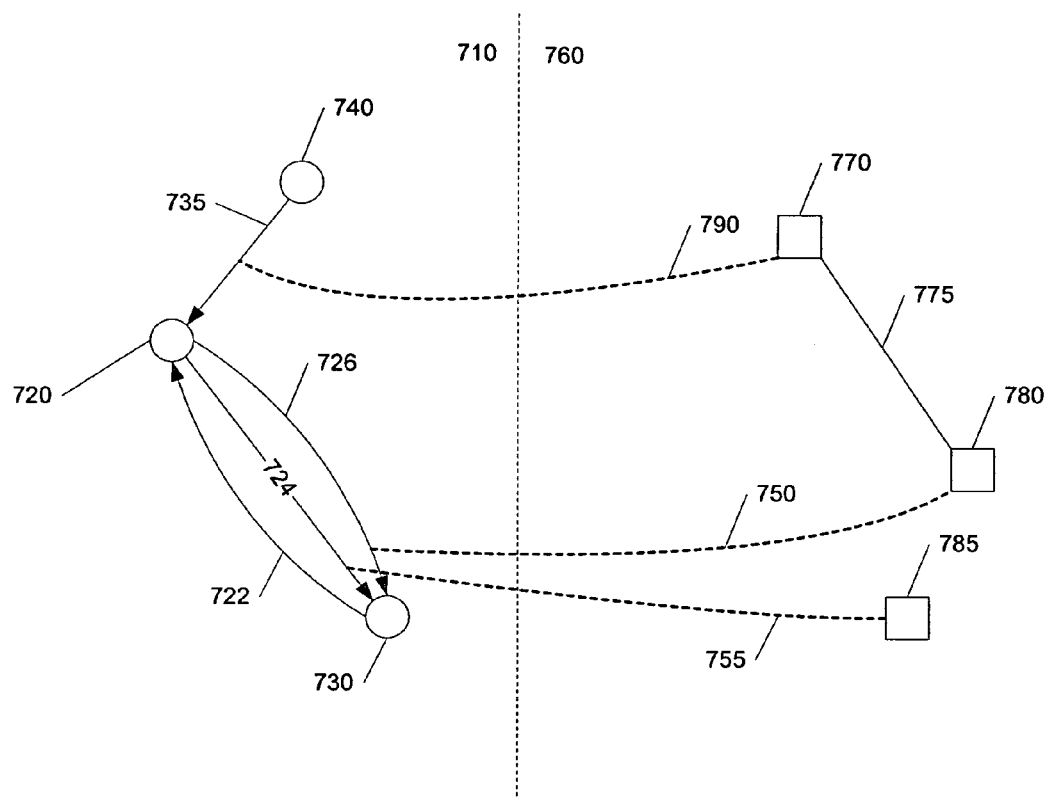
FIG. 7 is a simplified block diagram illustrating coupling between the people map data structure and the evidence map data structure, in accord with one embodiment of the present invention.

FIG. 7 is a simplified block diagram illustrating an example of the coupling between the people map data structure and the evidence map data structure, in accord with one embodiment of the present invention. FIG. 7 provides an illustration of nodes 720, 730 and 740 from people map data structure 710 and nodes 770 and 780 from evidence map data structure 760 (the nodes in the people and evidence map data structures are illustrated using circles and squares in order to provide distinction, but any shapes can be used to visualize nodes in either data structure). FIG. 7 further illustrates that people map data structure nodes 720 and 730 are linked by at least communication links 722, 724 and 726. These links are defined when the social network of the people map data structure is generated. Each visualized link in the visualization of the people map data structure can represent one or more communication items between the nodes. Each communication item can have a corresponding node in the evidence map that refers to the communication item (e.g., an electronic mail or voicemail message) or a document incorporated in a communication item (e.g., a file attached to an electronic mail). FIG. 7 illustrates a coupling 750 between people map data structure link 726 and evidence map data structure node 780, and another coupling 755 between people map data structure link 724 and evidence map data structure node 785. Since the same items of data are used to build both the people map data structure and the evidence map data structure, such coupling can be provided in a straightforward manner through the use of the common information. Through this coupling, additional information can be provided related to a visualized link of the people map data structure by referring to the information stored in the evidence map data structure, as discussed above. As discussed above, the coupling between the maps can be provided by metadata stored in the evidence map data structure or the people map data structure, or both. The coupling can also be provided by the data comprising the communication item itself, which is represented by the node in the evidence map data structure. The present invention is not limited by the information providing the coupling or the type of coupling provided, nor is the invention limited by the manner in which the coupling information is stored (in either of the map data structures or elsewhere).

FIG. 7 illustrates a further advantage of the coupling between a people map data structure and an evidence map data structure. As stated above, people map data structure link 726 between nodes 720 and 730 is coupled to evidence map data structure node 780. Examination of the evidence map data structure provides a link 775 between evidence map data structure node 780 and node 770. Such a link can be the result of the items of evidence being either substantially similar or otherwise related, as discussed above. Evidence map data structure node 770 is illustrated as being coupled to a link 735 in the people map data structure between node 720 and 740. Since the people map data structure can provide directed links between nodes (that is, the communication originated at one node and terminated at another), as illustrated, link 735 shows that evidence item 770 was provided to people map data structure node 720 by node 740. If the communication represented by link 735 occurred prior to the communication represented by link 726, that is suggestive of the information ultimately provided to people map data structure node 730 having originated not at node 720, but at node 740. In this manner, the coupling between the people map data structure and the evidence map data structure can be used to trace the spread of information throughout an organization and beyond that organization to outside entities.

As discussed above, preferred embodiments of the invention incorporate a centralized communication data repository that archives all communications-related data items. Through the use of such a repository, an organization can help to ensure preservation of evidence while continuing routine operations that are critical to that organization's ongoing activities. Further, through the use of a separate communication data repository, examination of data items in that repository has a reduced impact on the day-to-day information technology operations of the organization.

Embodiments of the present invention can be used to enhance analysis of data in preparation for production in electronic discovery for litigation. For example, if a member of an organization is suspected of improperly distributing information, a visualization of the people map data structure can be used to show the member's social network; that is, the people with whom the member has communicated. The various communication links represented by the social network can then be searched for topics related to the information suspected of having been improperly distributed. Each identified link can then be examined more closely by looking at the details related to that link and switching over to the evidence map to view the information stored related to that item of communication (e.g., headers of an electronic mail, the body of an electronic mail or other communication, and the like). The evidence map can then be used to determine whether the data item of interest has a relationship to any other data items whose distribution can then also be examined. Further, the relationships between items displayed in the evidence map can also be used to determine those data items that should be produced in response to relevant discovery requests.

Embodiments of the present invention can also help to avoid inadvertent disclosure of privileged documents by, for example, setting rules that flag certain data items as "confidential," "privileged" or "sensitive." Such rules can be exercised by searching for key words associated with various data items or by setting metadata classes related to privilege or confidential documents. Such metadata classes can be associated with an information plane that can be used to add or eliminate such flagged documents from a visual display of either the people map data structure or the evidence map data structure or both.

Embodiments of the present invention can also retain information related to communication data items that are moved to off-line data storage. For example, reduced information about the off-line communication data item can be retained in the communications data repository or the map data structures and should analysis performed by a user of the system result in a determination that the data item be restored for production, then such restoration can be performed.

An Example Computing And Network Environment

As shown above, the present invention can be implemented using a variety of computer systems and networks. An example of one such computing and network environment is described below with reference to FIGS. 8 and 9.

Figure 8:
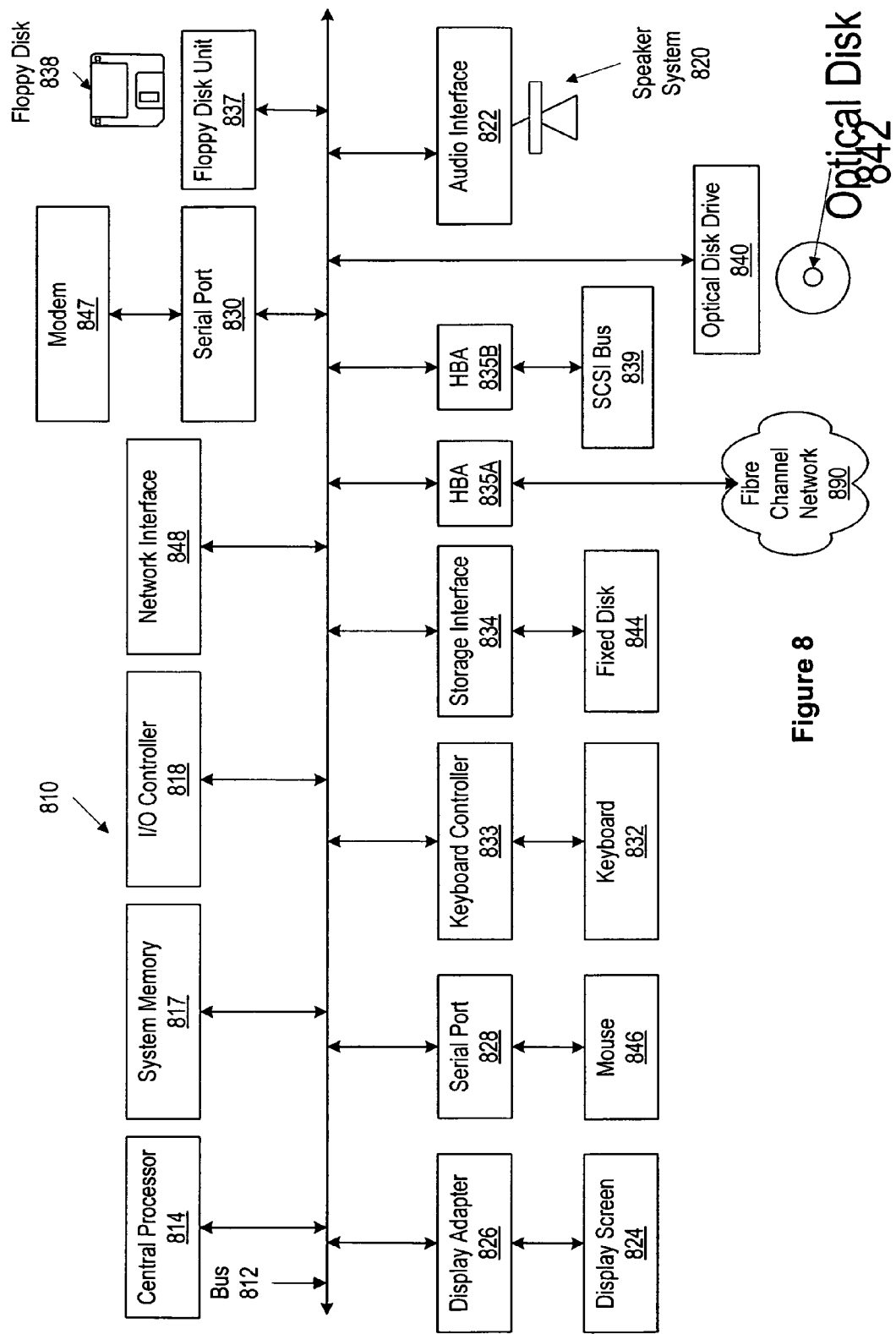
FIG. 8 is a simplified block diagram illustrating a computer system suitable for implementing the present invention.

FIG. 8 depicts a block diagram of a computer system 810 suitable for implementing the present invention. Computer system 810 includes a bus 812 which interconnects major subsystems of computer system 810, such as a central processor 814, a system memory 817 (typically RAM, but which may also include ROM, flash RAM, or the like), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), a storage interface 834, a floppy disk drive 837 operative to receive a floppy disk 838, a host bus adapter (HBA) interface card 835A operative to connect with a Fibre Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812).

Bus 812 allows data communication between central processor 814 and system memory 817, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 810 are generally stored on and accessed via a computer readable medium, such as a hard disk drive (e.g., fixed disk 844), an optical drive (e.g., optical drive 840), a floppy disk unit 837, or other storage medium. Additionally, applications can be in the form of electronic signals modulated in accordance with the application and data communication technology when accessed via network modem 847 or interface 848.

Storage interface 834, as with the other storage interfaces of computer system 810, can connect to a standard computer readable medium for storage and/or retrieval of information, such as a fixed disk drive 844. Fixed disk drive 844 may be a part of computer system 810 or may be separate and accessed through other interface systems. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present invention. The devices and subsystems can be interconnected in different ways from that shown in FIG. 8. The operation of a computer system such as that shown in FIG. 8 is readily known in the art and is not discussed in detail in this application. Code to implement the present invention can be stored in computer-readable storage media such as one or more of system memory 817, fixed disk 844, optical disk 842, or floppy disk 838. The operating system provided on computer system 810 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 9:
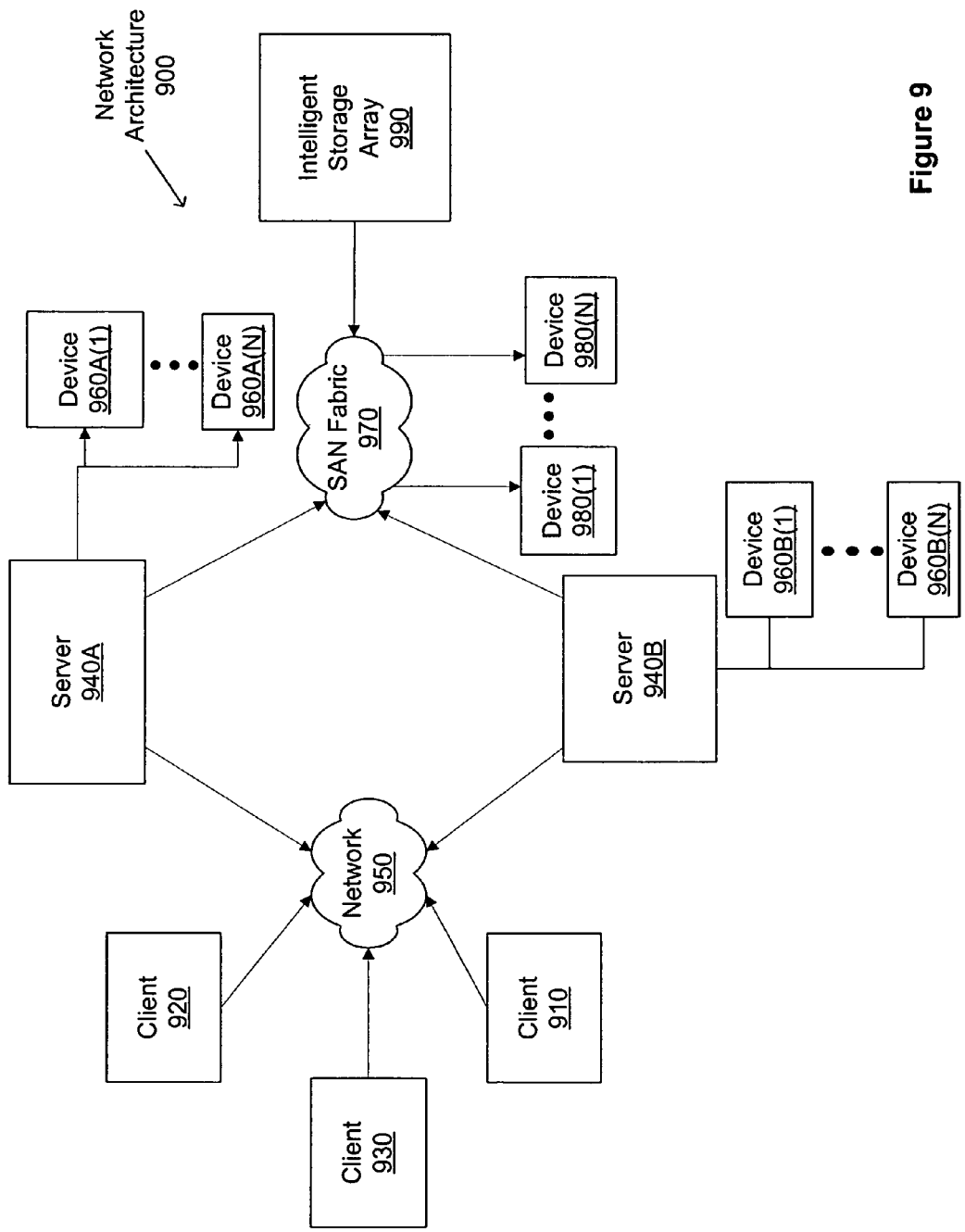
FIG. 9 is a block diagram depicting a network architecture suitable for implementing the present invention.

FIG. 9 is a block diagram depicting a network architecture 900 in which client systems 910, 920 and 930, as well as storage servers 940A and 940B (any of which can be implemented using computer system 810), are coupled to a network 950. Storage server 940A is further depicted as having storage devices 960A(1)-(N) directly attached, and storage server 940B is depicted with storage devices 960B(1)-(N) directly attached. Storage servers 940A and 940B are also connected to a SAN fabric 970, although connection to a storage area network is not required for operation of the invention. SAN fabric 970 supports access to storage devices 980(1)-(N) by storage servers 940A and 940B, and so by client systems 910, 920 and 930 via network 950. Intelligent storage array 990 is also shown as an example of a specific storage device accessible via SAN fabric 970.

With reference to computer system 810, modem 847, network interface 848 or some other method can be used to provide connectivity from each of client computer systems 910, 920 and 930 to network 950. Client systems 910, 920 and 930 are able to access information on storage server 940A or 940B using, for example, a web browser or other client software (not shown). Such a client allows client systems 910, 920 and 930 to access data hosted by storage server 940A or 940B or one of storage devices 960A(1)-(N), 960B(1)-(N), 980(1)-(N) or intelligent storage array 990. FIG. 9 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 810). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments can be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:

storing communication data, wherein the communication data comprises a plurality of communication items;

generating a people map data structure, using the communication data, wherein the people map data structure comprises:

a first node of the people map data structure corresponding to a first person, a second node of the people map data structure corresponding to a second person, and a link between the first and second nodes of the people map data structure, wherein the link corresponds to one or more communication items of the communication data, wherein the one or more communication items were transmitted between the first person and the second person;

generating an evidence map data structure, using the communication data, wherein the evidence map data structure comprises:

a first node of the evidence map data structure corresponding to a first communication item of the communication data, a second node of the evidence map data structure corresponding to a second communication item of the communication data, and a second link between the first and second nodes of the evidence map data structure, wherein the second link corresponds to a relationship between the first and second communication items; and coupling the people map data structure and the evidence map data structure.

2. The method of claim 1 wherein said generating the people map data structure comprises:
 for the first person, identifying, from the communication data, each communication item associated with the first person; and
 for each identified communication item, linking the first person with a respective recipient of the identified communication item.

3. The method of claim 2 wherein the first person is a member of an organization associated with the communication data.

4. The method of claim 2 wherein the recipient is one of a member of the organization or a person outside the organization who receives the identified communication item.

5. The method of claim 2 further comprising:
 displaying a people map image using the people map data structure, wherein
  a node of the people map image corresponds to one of the first person and the recipient, and
  a link between nodes of the people map image corresponds to one or more identified communication items between the first person and the recipient.

6. The method of claim 5 further comprising:
 displaying select information in the people map image, wherein
  the select information comprises metadata associated with one or more of the nodes and links.

7. The method of claim 6 further comprising:
 performing said displaying using an information plane associated with the select information.

8. The method of claim 6 wherein the select information associated with a link of the one or more nodes and links comprises:
 one or more of statistics, a summary, and a report associated with one or more of the communication items represented by the link.

9. The method of claim 1 wherein said generating an evidence map data structure comprises:
 for the first communication item of the communication data, identifying
  the relationship between the first communication item of the communication data and the second communication item of the communication data.

10. The method of claim 9 wherein the communication data comprises data related to one or more of electronic mail messages, instant messaging (IM), facsimiles, telephone communications, voicemail messages, push-to-talk messages, cellular short message service, PIN messages, file transfers, and file archives.

11. The method of claim 9 wherein the relationship between the first and second communication items of the communication data is one or more of:
 substantial similarity of the first and second communication items,
 reference of the first communication item by the second communication item,
 reference of the second communication item by the first communication item,
 inclusion of the first communication item in the second communication item,
 inclusion of the second communication item in the first communication item,
 derivation of the first communication item by the second communication item, and
 derivation of the second communication item by the first communication item.

12. The method of claim 9 further comprising:
 displaying an evidence map image using the evidence map data structure, wherein
  a node of the evidence map image corresponds to one of the first and second communication items of the communication data, and
  a link between nodes of the evidence map image corresponds to the relationship between the first and second communication items of the communication data.

13. The method of claim 12 further comprising:
 displaying select information in the evidence map image, wherein
  the select information comprises metadata associated with one or more of the nodes and links.

14. The method of claim 13 further comprising:
 performing said displaying using an information plane associated with the select information.

15. The method of claim 1 further comprising:
 deriving the metadata from the communication data.

16. The method of claim 1 further comprising:
 providing external data and metadata related to the communication data, from a source external to the communication data; and
 performing said generating the people map data structure, using the external data and metadata.

17. An apparatus comprising:
 a communications data repository configured to store communication data, wherein the communication data comprises a plurality of communication items; and
 a processor, coupled to the communications data repository, and configured to generate a people map data structure, using the communication data, wherein the people map data structure comprises:
  a first node of the people map data structure corresponding to a first person,
  a second node of the people map data structure corresponding to a second person, and
  a link between the first and second nodes of the people map data structure, wherein the link corresponds to one or more communication items of the communication data, wherein the one or more communication items were transmitted between the first person and the second person,
 generate an evidence map data structure, using the communication data, wherein the evidence map data structure comprises:
  a first node of the evidence map data structure corresponding to a first communication item of the communication data,
  a second node of the evidence map data structure corresponding to a second communication item of the communication data, and
  a second link between the first and second nodes of the evidence map data structure, wherein the second link corresponds to a relationship between the first and second communication items, and
 couple the people map data structure and the evidence map data structure.

18. The apparatus of claim 17 wherein the processor is further configured to:
 identify, from the communication data, each communication item associated with the first person; and
 link the first person with a respective recipient of each identified communication item.

19. The apparatus of claim 18 further comprising:
a display screen coupled to the processor; and
the processor further configured to display, on the display screen, a people map image corresponding to the people map data structure, wherein
a node of the people map image corresponds to one of the first person and the recipient, and
a link between nodes of the people map image corresponds to one or more identified communication items between the first person and the recipient.

20. The apparatus of claim 17 wherein the processor is further configured to:
identify the relationship between the first communication item of the communication data and the second communication item of the communication data.

21. The apparatus of claim 20 further comprising:
a display screen coupled to the processor; and
the processor further configured to display, on the display screen, an evidence map image corresponding to the evidence map data structure, wherein
a node of the evidence map image corresponds to one of the first and second communication items of the communication data, and
a link between nodes of the evidence map image corresponds to the relationship between the first and second communication items of the communication data.

22. A system comprising:
storing means for storing communication data, wherein the communication data comprises a plurality of communication items;
generating people map data structure means for generating a people map data structure, using the communication data, wherein the people map data structure comprises:
a first node of the people map data structure corresponding to a first person,
a second node of the people map data structure corresponding to a second person, and
a link between the first and second nodes of the people map data structure, wherein the link corresponds to one or more communication items of the communication data, wherein the one or more communication items were transmitted between the first person and the second person;
generating evidence map data structure means for generating an evidence map data structure, using the communication data, wherein the evidence map data structure comprises:
a first node of the evidence map data structure corresponding to a first communication item of the communication data,
a second node of the evidence map data structure corresponding to a second communication item of the communication data, and
a second link between the first and second nodes of the evidence map data structure, wherein the second link corresponds to a relationship between the first and second communication items; and
coupling means for coupling the people map data structure and the evidence map data structure.

23. The system of claim 22 wherein said generating people map data structure means for generating the people map data structure comprises:
identifying means for identifying, from the communication data, each communication item associated with the first person; and
linking means for linking the first person with a respective recipient of each identified communication item.

24. The system of claim 23 further comprising:
displaying means for displaying a people map image using the people map data structure, wherein
a node of the people map image corresponds to one of the first person and the recipient, and
a link between nodes of the people map image corresponds to one or more identified communication items between the first person and the recipient.

25. The system of claim 22 wherein said generating evidence map data structure means for generating an evidence map data structure comprises:
identifying means for identifying the relationship between the first communication item of the communication data and the second communication item of the communication data.

26. The system of claim 25 further comprising:
displaying means for displaying an evidence map image using the evidence map data structure, wherein
a node of the evidence map image corresponds to one of the first and second communication items of the communication data, and
a link between nodes of the evidence map image corresponds to the relationship between the first and second communication items of the communication data.

27. A computer program product comprising:
a first set of instructions, executable by a processor, configured to generate a people map data structure, using stored communication data, wherein
the stored communication data comprises a plurality of communication items, and
the people map data structure comprises:
a first node of the people map data structure corresponding to a first person,
a second node of the people map data structure corresponding to a second person, and
a link between the first and second nodes of the people map data structure, wherein the link corresponds to one or more communication items of the stored communication data, wherein the one or more communication items were transmitted between the first person and the second person;
a second set of instructions, executable by the processor, configured to generate an evidence map data structure, using the stored communication data, wherein the evidence map data structure comprises:
a first node of the evidence map data structure corresponding to a first communication item of the stored communication data,
a second node of the evidence map data structure corresponding to a second communication item of the stored communication data, and
a second link between the first and second nodes of the evidence map data structure, wherein the second link corresponds to a relationship between the first and second communication items; and
a third set of instructions, executable by the processor, configured to couple the people map data structure and the evidence map data structure.

28. The computer program product of claim 27 wherein the second set of instructions comprises:
a fourth set of instructions, executable by the processor, configured to identify, from the stored communication data, each communication item associated with the first person; and
a fifth set of instructions, executable by the processor, configured to link the first person with a respective recipient of each identified communication item.

29. The computer program product of claim 28 further comprising:
- a sixth set of instructions, executable by the processor, configured to display a people map image using the people map data structure, wherein
  - a node of the people map image corresponds to one of the first person and the recipient, and
  - a link between nodes of the people map image corresponds to one or more identified communication items between the first person and the recipient.

30. The computer program product of claim 27 wherein the third set of instructions comprises:
- a fourth set of instructions, executable by the processor, configured to identify the relationship between the first communication item of stored communication data and the second communication item of stored communication data.

31. The computer program product of claim 30 further comprising:
- a fifth set of instructions, executable by the processor, configured to display an evidence map image using the evidence map data structure, wherein
  - a node of the evidence map image corresponds to one of the first and second communication items of the stored communication data, and
  - a link between nodes of the evidence map image corresponds to the relationship between the first and second communication items of the stored communication data.

* * * * *